United States Patent
Desai et al.

(10) Patent No.: US 11,553,431 B2
(45) Date of Patent: Jan. 10, 2023

(54) TIME SLOTTED SCAN RECEIVER

(71) Applicant: Intel Corporation, Santa Clara, CA (US)

(72) Inventors: Prasanna Desai, Elfin Forest, CA (US); Chen Meng, Sunnyvale, CA (US); Yuwei Zhang, Pleasanton, CA (US); Jinyong Lee, Fremont, CA (US); Oren Kaidar, Binyamina (IL); Sharon Heruti, Petah Tikva (IL); Thomas W. Brown, Portland, OR (US); Assaf Gurevitz, Ramat Hasharon (IL); Anthony Tsangaropoulos, San Carlos, CA (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 15/733,329

(22) PCT Filed: Aug. 31, 2018

(86) PCT No.: PCT/US2018/049204
§ 371 (c)(1),
(2) Date: Jun. 26, 2020

(87) PCT Pub. No.: WO2019/172951
PCT Pub. Date: Sep. 12, 2019

(65) Prior Publication Data
US 2021/0120496 A1    Apr. 22, 2021

Related U.S. Application Data

(60) Provisional application No. 62/640,255, filed on Mar. 8, 2018.

(51) Int. Cl.
*H04W 52/02* (2009.01)
*H04B 17/318* (2015.01)
(Continued)

(52) U.S. Cl.
CPC ...... *H04W 52/0235* (2013.01); *H04B 17/318* (2015.01); *H04B 17/345* (2015.01);
(Continued)

(58) Field of Classification Search
None
See application file for complete search history.

(56) References Cited

U.S. PATENT DOCUMENTS 7,457,378 B1 * 11/2008 Sher ............... H04B 1/0014
375/340
8,401,120 B1    3/2013 Ozgur
(Continued)

FOREIGN PATENT DOCUMENTS

WO    2019132922 A1    7/2019

OTHER PUBLICATIONS

PCT International Preliminary Reporton Patentability issued in PCT/US2018/049204, dated Sep. 17, 2020; 11 pages.
(Continued)

*Primary Examiner* — Christine T Duong
(74) *Attorney, Agent, or Firm* — Alliance IP, LLC

(57) ABSTRACT

In one embodiment, an apparatus of a wireless communication device includes control circuitry to cause receiver circuitry of the wireless communication device to switch between an on-mode and an off-mode. The apparatus also includes synchronizing circuitry to: perform a correlation on signals of a packet received by the receiver circuitry when in the on-mode to detect a pattern in the received signals, and cause the control circuitry to hold the receiver circuitry in the on-mode based on detection of the pattern in the received signals. The apparatus further includes demodulation circuitry to process additional signals of the packet received by the receiver circuitry when held in the on-mode.

23 Claims, 11 Drawing Sheets

(51) Int. Cl.
*H04B 17/345* (2015.01)
*H04L 1/00* (2006.01)
*H04W 56/00* (2009.01)

(52) U.S. Cl.
CPC ....... *H04L 1/0061* (2013.01); *H04W 52/0238* (2013.01); *H04W 56/001* (2013.01)

(56) References Cited

U.S. PATENT DOCUMENTS

| | | |
|---|---|---|
| 2009/0023416 A1 | 1/2009 | Haber et al. |
| 2009/0122735 A1* | 5/2009 | Barthel ................ H04B 7/2656 370/311 |
| 2009/0180464 A1 | 7/2009 | Walley et al. |
| 2010/0056055 A1 | 3/2010 | Ketari |
| 2012/0235865 A1* | 9/2012 | Nath .................... H04W 64/00 342/451 |
| 2013/0273852 A1* | 10/2013 | Tsai .................... H04M 1/0216 455/41.3 |
| 2018/0006854 A1 | 1/2018 | Zhang |
| 2018/0091980 A1* | 3/2018 | Sun ................... H04W 74/0808 |
| 2018/0199190 A1* | 7/2018 | Khan ........................ G01S 5/02 |
| 2019/0190765 A1* | 6/2019 | Murali ................ H04L 27/0014 |

OTHER PUBLICATIONS

PCT International Search Report and Written Opinion issued in PCT/US2018/049204, dated Jan. 2, 2019; 14 pages.

* cited by examiner

TIME SLOTTED SCAN RECEIVER

CROSS REFERENCE TO RELATED APPLICATIONS

This Application is a national stage application under 35 U.S.C. § 371 of PCT International Application Serial No. PCT/US2018/049204, filed on Aug. 31, 2018, entitled "Time-Slotted Scanning for Wireless Receiver Devices", which claims the benefit of, and priority from, U.S. Provisional Patent Application No. 62/640,255, entitled "Time Slotted Scan Receiver" and filed Mar. 8, 2018, the entire disclosures of which are incorporated herein by reference.

TECHNICAL FIELD

Embodiments described herein generally relate to wireless communication, and more particularly to time-slotted scanning techniques for wireless devices.

BACKGROUND

With the proliferation of wireless devices, such as wireless peripheral devices, receiver devices (e.g. smartphones, laptops, etc.) may increase their packet detection accuracy by scanning more frequently. For example, there may be a number of Bluetooth® Low Energy (BLE) peripheral devices, such as home automation sensors and actuators (e.g., smart lights and alarm systems), sports sensors, wearable devices (e.g., wireless headsets), hearing aids, smart watches, and the like, all advertising on only three designated frequencies in the 2.4 GHz industrial, scientific and medical (ISM) radio band, leading to more advertising packet collisions. Furthermore, proximate interference caused by other 2.4 GHz devices (e.g., WiFi and some LTE bands) may further degrade advertiser packet detection. More frequent scanning by the wireless receiver device may avoid at least some of these issues, but may also lead to additional power and battery consumption on the receiver device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
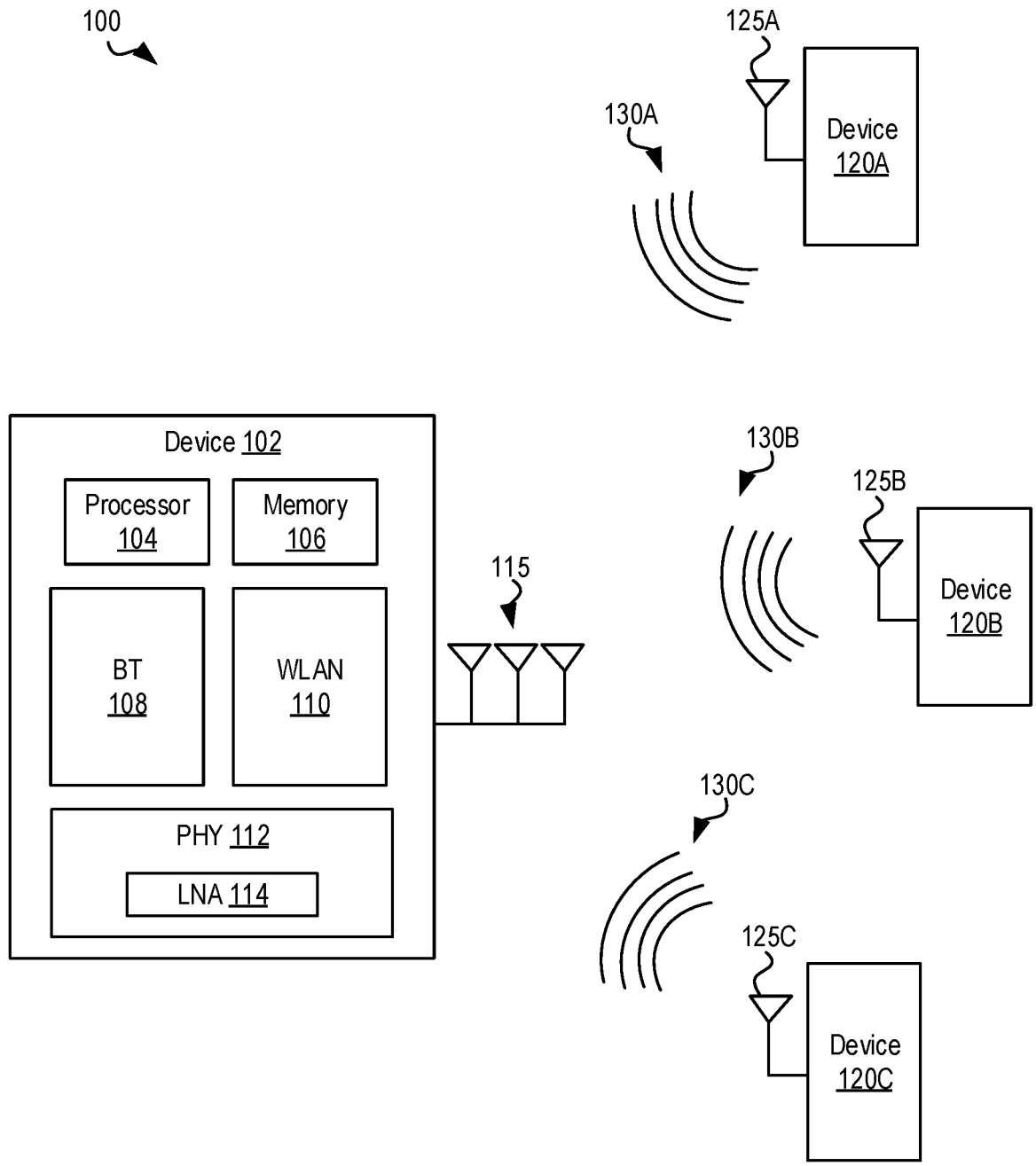
FIG. 1 is a diagram of an example wireless communication environment that includes a central device and multiple peripheral devices according to some embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

For simplicity and clarity of illustration, the drawing figures illustrate the general manner of construction, and descriptions and details of well-known features and techniques may be omitted to avoid unnecessarily obscuring the discussion of the described embodiments. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of actions, the order of such actions as presented herein is not necessarily the only order in which such actions may be performed, and certain of the stated actions may possibly be omitted and/or certain other actions not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

FIG. 1 is a diagram of an example wireless communication environment 100 that includes a central device 102 and multiple peripheral devices 120 according to some embodiments. In the example shown, the peripheral devices 120 are wirelessly transmitting advertising information 130 to the central device 102 via their antennas 125. In some cases, the advertising information 130 is transmitted on a frequency within the 2.4 GHz industrial, scientific and medical (ISM) radio band. The advertising information may include information used to establish wireless communication between the central device 102 and the particular device 120 sending the advertising information, information about the particular device 120 (e.g., information regarding a sensor of the device 120), or another type of information. In some embodiments, the advertising information 130 may include a packet formatted similar to one of the example packet formats shown in FIGS. 2A-2B. In certain embodiments, the advertising information 130 may include an advertising packet formatted according to the Bluetooth® Low Energy (BLE) protocol, an inquiry or paging packet formatted according to the Bluetooth® Basic Rate (BR) protocol, a packet formatted according to an IEEE 802.11 protocol (e.g., WiFi), or a packet formatted according to another type of wireless communication protocol.

The example device 102 includes a processor 104 (e.g., a central processing unit (CPU), application processing unit (APU), another type of data processing apparatus, or a combination thereof), memory 106 (e.g., random access memory (RAM), read only memory (ROM), or a combination thereof), Bluetooth® circuitry 108 (e.g., including a Bluetooth baseband processor, radio integrated circuit, front-end module, and optionally at least one antenna), an wireless local area network (WLAN) circuitry 110 (e.g., a WLAN circuit card or WLAN system including a WLAN baseband processor, radio integrated circuit, front-end module and optionally at least one antenna). Antennas 115 are configured to transmit or receive wireless signals for communication with the Bluetooth circuitry and/or the WLAN circuitry. Each of the Bluetooth circuitry 109 and WLAN circuitry 110 may include physical layer (PHY) circuitry and Medium Access Control (MAC) circuitry. The device 102 may also include additional physical layer (PHY) circuitry 112 for performing low-level signal processing for wireless communication by one or more of the RF processing circuitries 108, 110. The PHY circuitry 112 may include one or more digital circuits, analog circuits, or other hardware for performing the low-level signal processing. For instance, in the example shown, the PHY circuitry 112 includes a low noise amplifier (LNA) 114 for amplifying signals received by one or more of the antennas 115 of the device 102. In some instances, the PHY circuitry 112 may receive low-level signals from one or more of the antennas 115, process the signals, and provide the processed signals to one or more of the RF processing circuitries 108, 110.

Each of the devices 120 may be implemented in a similar manner to the device 102. For example, each of the devices 120 may include a processor, memory, network connectivity mechanism (such as the Bluetooth circuitry or WLAN circuitry), and PHY circuitry similar to processor 104, memory 106, RF processing circuitries 108, 110, and the PHY circuitry 112 the device 102. The devices 120 may include additional or fewer components than those of the device 102. For instance, the devices 120 may only include one network connectivity mechanism rather than the multiple network connectivity mechanisms of the device 102. In addition, the devices 120 may include certain circuitry not included on the device 102. As one example, the devices 120 may include particular sensor circuitry (e.g., accelerometers, temperature sensors, etc.). The devices 120 may be implemented in another manner as well.

To improve the detection statistics of the advertising information 130 (e.g., of BLE or BR advertisements), the device 102 may be configured to scan for the advertising information 130 relatively often. However, more frequent scanning may substantially increase power consumption on the device 102, negatively impacting battery life. Thus, in certain aspects of the present disclosure, a time-slotted scanning technique may be used by the device 102 to increase its packet detection accuracy and lower overall power consumption by the wireless circuitry. By lowering the power consumption associated with scanning, the device 102 can effectively scan with higher duty-cycles, thereby achieving faster discovery times of the devices 120 and faster connection setup latencies, and improving the user experience.

Figure 5A:
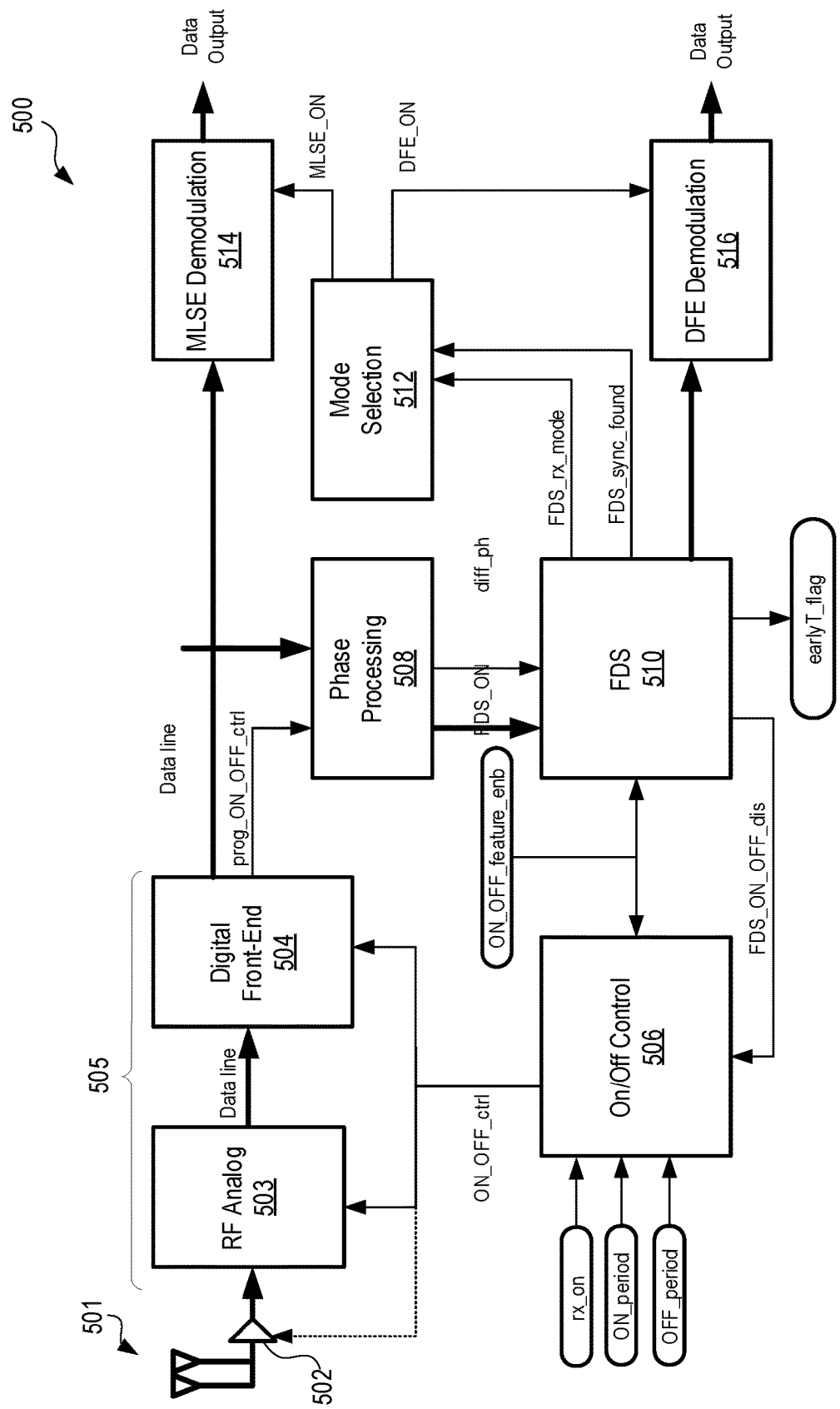
FIGS. 5A-5D are diagrams of example components for implementing a time-slotted scanning technique on a wireless receiver device according to some embodiments.

In certain aspects, the time-slotted scanning technique may involve cycling one or more components of the RF processing circuitries (e.g., receiver circuitry, such as the receiver circuitry 505 of FIG. 5A, implemented in the Bluetooth circuitry 108, the WLAN circuitry 110, or both) of the device between an on-mode and an off-mode until a packet is detected when the circuitry is in the on-mode. In addition, in some embodiments, components external to the RF processing circuitry (e.g., an eLNA or other PHY circuitry external to the RF processing circuitries 108, 110) may be synchronously cycled between an on-mode and an off-mode along with the receiver circuitry. For instance, in some devices, power consumption associated with scanning for devices may be dominated by external LNAs (eLNA), and so, by cycling the eLNA on/off in addition to the receiver circuitry, greater power savings may be achieved.

In some cases, as the ratio of the scan window relative to the scan interval increases, the active RF/PHY power consumption may dominate the overall power consumption of the scanning operations relative to the idle periods outside of the scan window. The on/off cycling may be according to a fixed timing pattern. For example, in some cases, BLE scans may be performed with a duty cycle of 90 ms (in the on-mode) out of every 300 ms. As another example, BR scans may implement an approximately 15% scan window to scan interval ratio (in the case of BR, the Hamming distance of the 64 bit synchronization word is large ($d_{min}=14$), so the time-slotted technique may be suitable as well). In some cases, the slotted on/off cycling may be dynamically determined to adapt to changes in the ratio between the Probability of False Alarm (PFA) and the Probability of Missed Detection (PMD) (e.g., PFA/PMD). For instance, in some examples, the on/off ratio may be determined adaptively based on a signal-to-noise ratio (SNR), interference estimates, or other information about the channel or received signals.

Figure 2A:
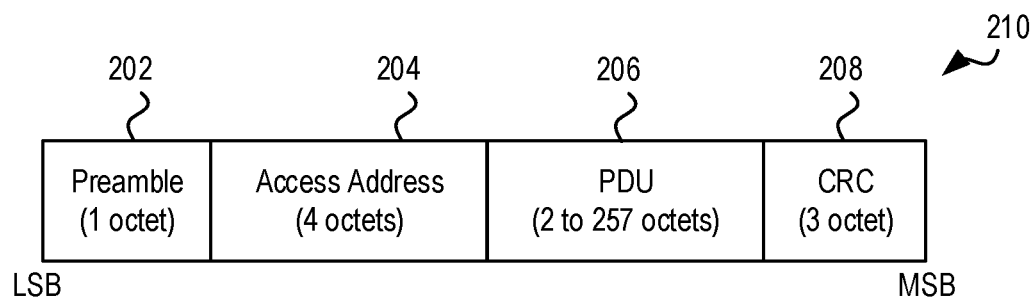
FIGS. 2A-2B are diagrams of example packet formats for use in wireless communication protocols according to some embodiments.
Figure 2B:
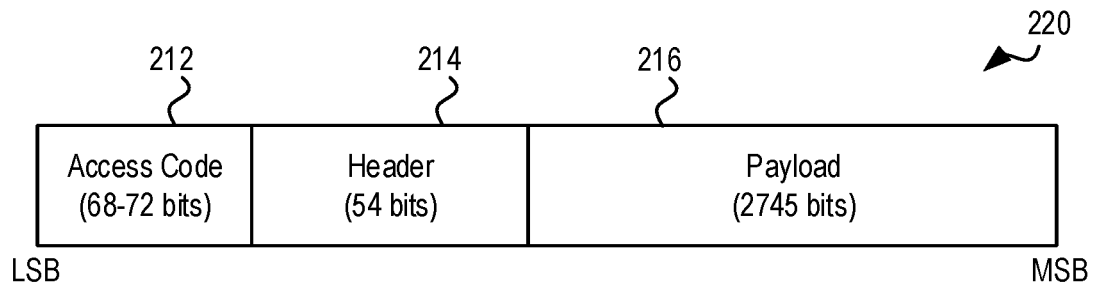

FIGS. 2A-2B are diagrams of example packet formats for use in wireless communication protocols according to some embodiments. In the example shown in FIG. 2A, the packet 210 includes a preamble 202 that consists of 1 octet (i.e., 8 bits), an access address 204 that consists of 4 octets (i.e., 32 bits), a protocol data unit (PDU) 206 that is of variable length and consists of 2-257 octets (i.e., 16-2056 bits), and a cyclic redundancy check (CRC) that consists of 3 octets (i.e., 24 bits). The preamble 202 may include information used for automatic gain control training, frequency synchronization, or timing estimation at the receiver device. The access address 204 may include information indicating that the packet 210 is an advertising packet (e.g., if sent in an advertising channel), or link layer information (e.g., if sent in a data channel). The PDU 206 may include information for processing or analysis by the receiving device. The PDU 206 may include a header and payload, with the header indicating a packet type, a purpose of the packet, or other information about the packet 210, and the payload may include payload data for processing. The CRC 208 may include information computed by the transmitting device based on the contents of one or more of the preamble 202, the access address 204, and the PDU 206, and may be used by the receiving device to detect errors in reception or processing of the packet at the receiver side. In some instances, the format of packet 210 may be used in an advertising packet of the BLE protocol. For example, for broadcast advertising packets in the BLE protocol, the preamble may be fixed as 0xAA and the access address 204 may be fixed as 0x8E89BED6.

In the example shown in FIG. 2B, the packet 220 includes an access code 212 that consists of 68-72 bits, a header 214 that consists of 54 bits, and a payload 216 that is fixed in length and consists of 2745 bits. The access code 212 may include information used for timing synchronization, offset compensation, paging and inquiry. The header 214 may include information about the packet 220. In some cases, the header 214 includes information for packet acknowledgement, packet numbering for out-of-order packet reordering, flow control, or error checking information. The payload 216 may include payload data for processing by the receiving devices. In some instances, the format of packet 220 may be used in an inquiry or paging packet of the Bluetooth® BR protocol.

Figure 3A:
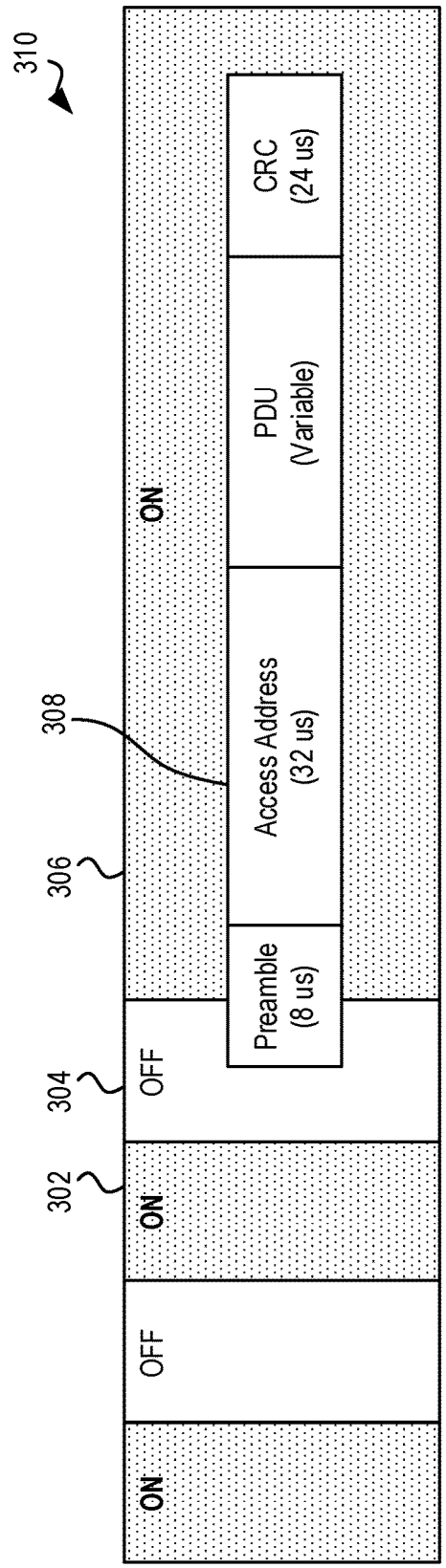
FIGS. 3A-3B are diagrams of example packet detections in time-slotted receiver scanning techniques according some embodiments.
Figure 3B:
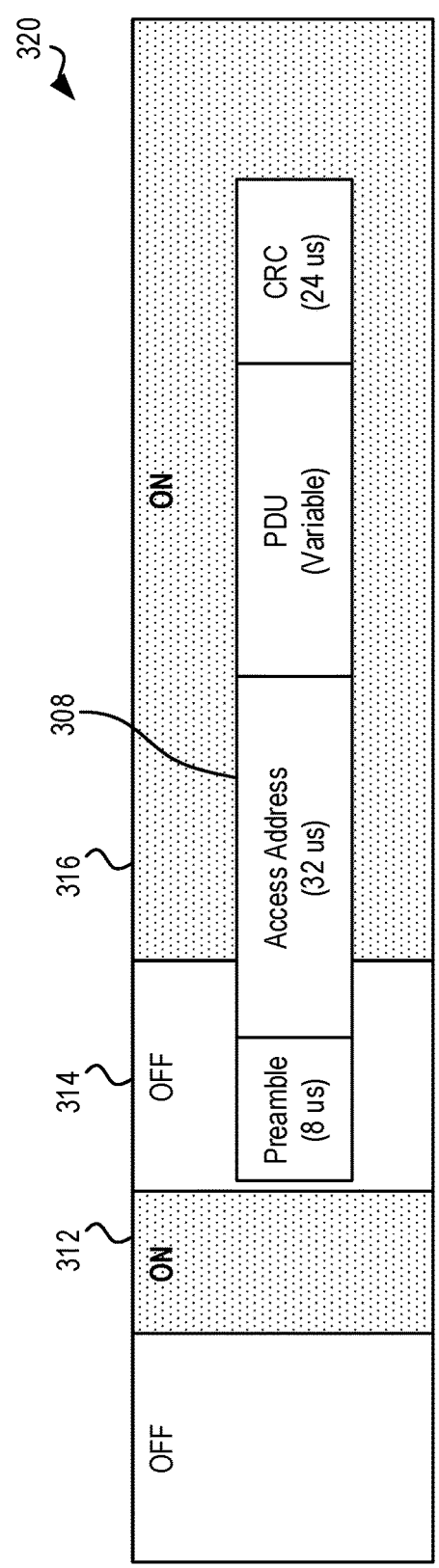

FIGS. 3A-3B are diagrams of example packet detections in time-slotted receiver scanning techniques according some embodiments. In particular, the examples show a relative timing of a BLE advertisement packet 308 being incident at a wireless receiver device as compared with the on/off cycling of the receiver circuitry within the receiver device (e.g., one or more components of the Bluetooth circuitry 108 of FIG. 1) or other circuitry (e.g., the LNA 114 of FIG. 1) of the receiver device according to a time-slotted scanning technique. In the examples shown, the BLE packet 308 uses binary GFSK modulation, in which a 1 bit transmission is 1 microsecond (μs) in duration.

Each example shows that the receiver circuitry cycles between an on-mode (e.g., 302 of FIG. 3A, 314 of FIG. 3B) and an off-mode (e.g., 304 of FIG. 3A, 314 of FIG. 3B) until a portion of the packet 308 is detected by the receiver circuitry. Once a portion of the packet 308 has been detected, the receiver circuitry remains in the on-mode (e.g., 306 of FIG. 3A, 316 of FIG. 3B) so that the remaining packet data can be received and processed or analyzed. FIG. 3A shows a time-slotted scanning technique with on/off periodicity of 8 μs/8 μs, and FIG. 3B shows a time-slotted scanning technique with on/off periodicity of 8 μs/12 μs. However, other on/off periodicities may be used as well, such as, by way of example only, 10 μs/10 μs. In some cases, the periodicity may be dynamically determined based on a SNR or interference metrics associated with the received signals.

The preamble and access address fields of the packet 308 may use binary GFSK modulation, in which 1-bit transmission is 1 microsecond (μs) in duration. Switching the receiver circuitry on and off in rapid succession to detect at least a portion of the 8 μs preamble during the scan window may be an aggressive approach (keeping in mind, for example, that BLE uses narrowband modulation with only approximately 1 MHz modulation bandwidth, so the analog as well as digital channel select filter bandwidth is narrow too) since the receiver circuitry may need at least a few microseconds (approximately 1-2 μs) for the automatic gain control (AGC) feedback loop to settle and for performing other necessary initial acquisition operations such as coarse frequency offset, symbol timing and frame timing estimation. Such a rapid on/off scheme could compromise the probability of false alarm and missed detection statistics of the receiver device. However, packet detection statistics may be improved by using a scheme in which both the 8 μs preamble as well as the 32 μs access address fields of the packet 308 are treated as a single 40 μs synchronization word, since the advertiser access address/code (AAC) may be a constant 32-bit pattern (e.g., in BLE, where it is known a priori and is the same for all advertisers).

As shown in FIGS. 3A-3B, in some cases, the receiver circuitry may be turned on after the packet transmission has already started but somewhere within the preamble or access address fields of the BLE packet 308. This is different than conventional scanning in receiver devices in which the beginning of the preamble is typically received after the receiver circuitry has already opened its scan window. Accordingly, in some embodiments, the receiver device may correlate the received data (which includes just a portion of the preamble or access address) against multiple possible time hypotheses depending on when the receiver started "listening" relative to the start of the BLE advertisement packet 308 reception/transmission. The correlation may be a multi-symbol correlation as described below, and may be implemented by circuitry similar to the correlator 520 of FIG. 5C. Furthermore, in some embodiments, a CRC check corresponding to the CRC value in the packet 308 may be used. That is, if the CRC value in the packet 308 does not match with a CRC value computed by the receiver device based on the packet data received, then the packet may be discarded.

In the case of BLE, the false alarm rate may be low because there are no other BLE packets transmitted on the advertising channels, i.e. the only BLE packets on the advertising channels use a fixed/predetermined preamble and access address. In the case of BR paging/inquiry packets, which may be transmitted on any of the 32 channels (each channel is one of the 1 MHz wide Bluetooth hop frequencies within the 2.4 GHz ISM band), there may be other BR/EDR traffic also present on the channel on which the paging/inquiry packets are transmitted. However, the time-slotted scanning technique may still be feasible due to the large minimum Hamming distance of 14 between code words.

Figure 4:
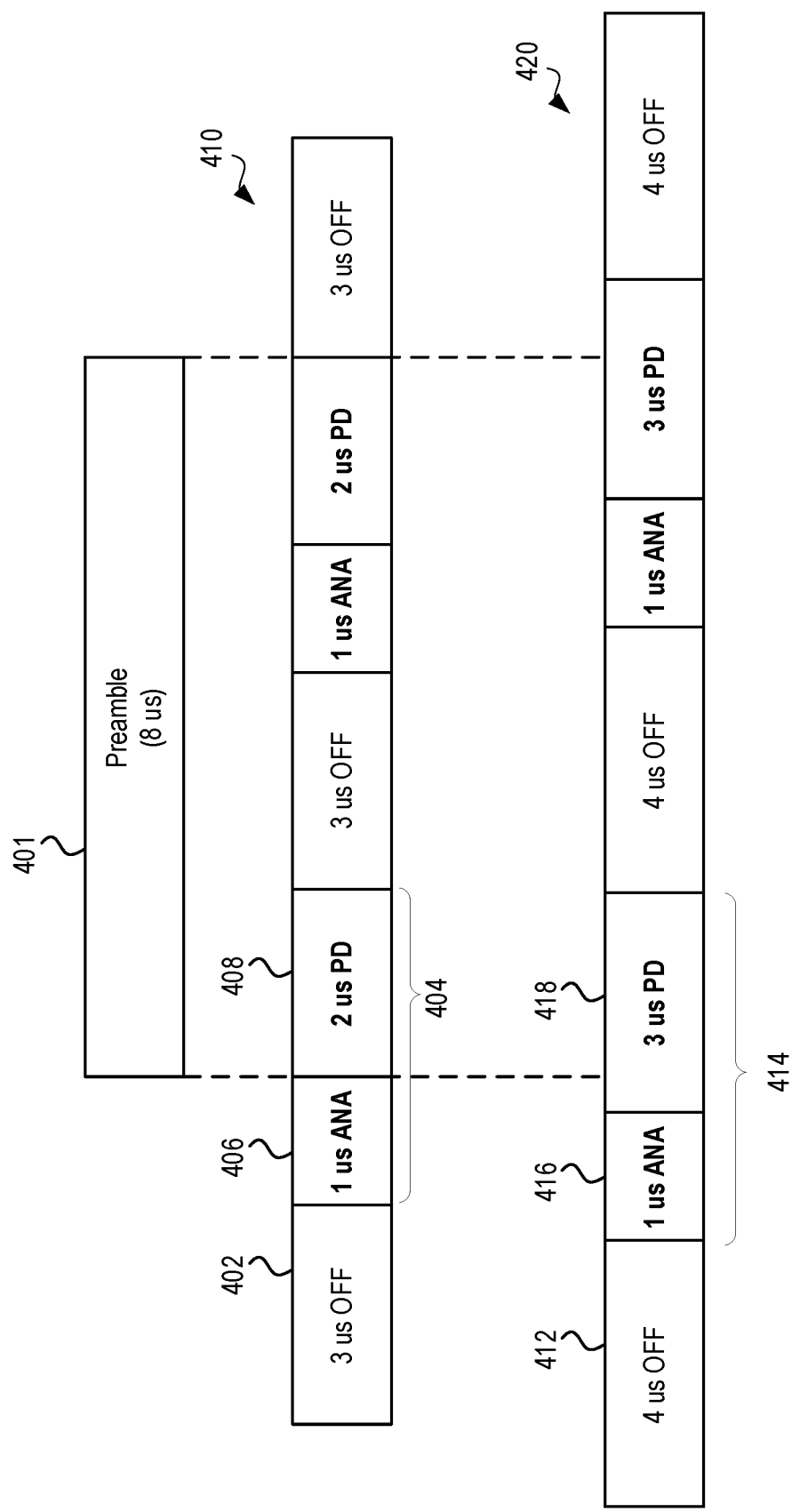
FIG. 4 is a diagram of example scanning intervals for a time-slotted receiver scanning technique relative to a preamble of a received packet according to some embodiments.

FIG. 4 is a diagram of example scanning intervals 410, 420 for a time-slotted receiver scanning technique relative to a preamble of a received packet according to some embodiments. The scanning interval 410 has an on/off periodicity of 3 μs/3 μs, while the scanning interval 420 has an on/off periodicity of 4 μs/4 μs. The on-mode periods 404, 414 shown in FIG. 4 include 1 μs of estimated analog startup time periods (ANA) 406, 416 followed by packet detection (PD) time periods 408, 418. The analog startup time period may refer to an amount of time needed for analog circuitry in the receiver device (e.g., circuitry in the Bluetooth circuitry 108 or in the PHY circuitry 112 of FIG. 1) to settle from transient electrical effects caused by the on/off power cycling in the circuit (also referred to as the transient settling time). During the analog startup time period, the receiver device may not be able to accurately detect or process packets received. However, once the analog circuitry has settled, then the receiver device may properly detect and process packet data during the packet detection time periods

Figure 6A:
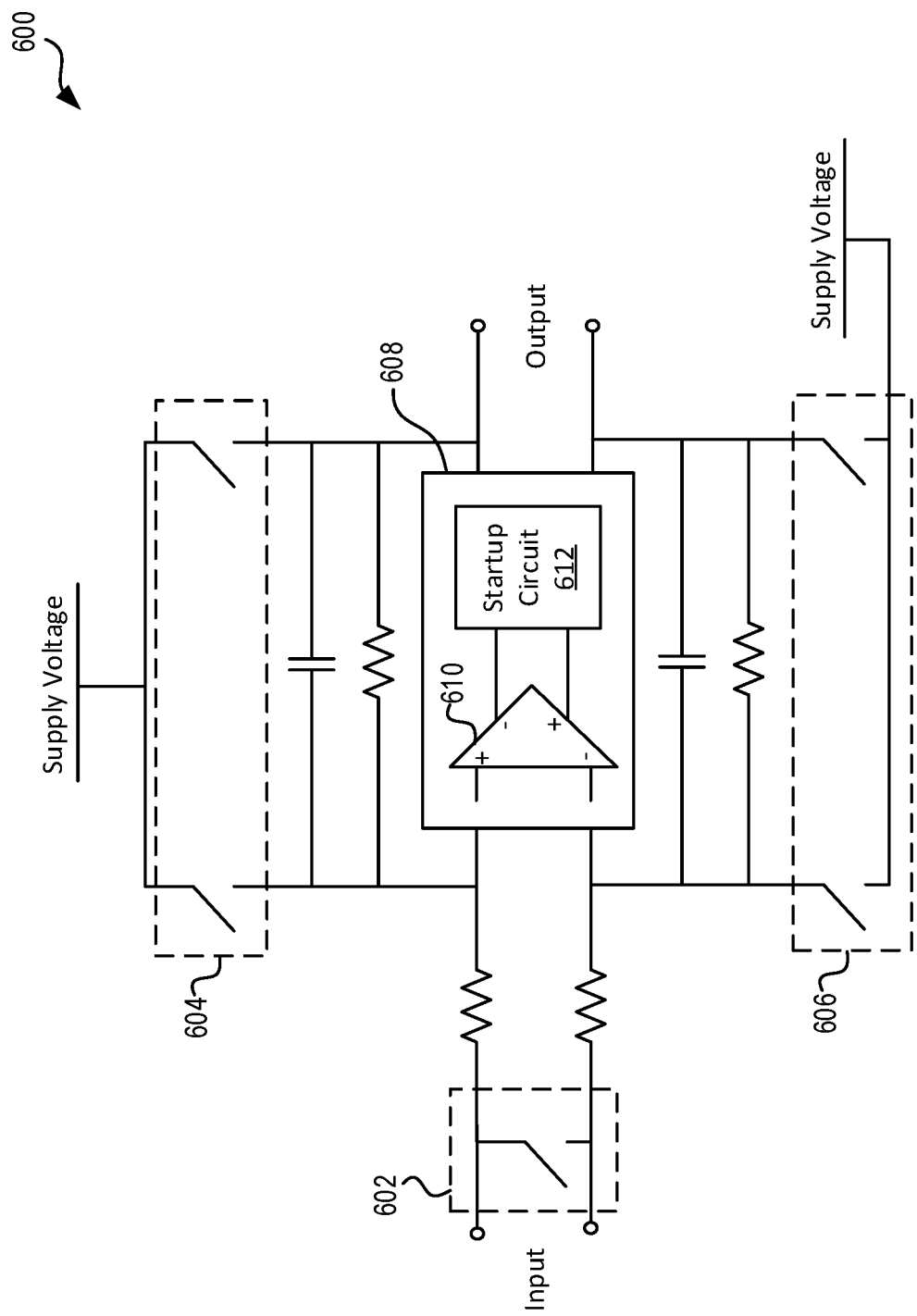
FIGS. 6A-6B are diagrams of an example scheme for reducing analog filter settling times in a wireless receiver device implementing a time-slotted scanning technique according to some embodiments.

408, 418. FIG. 6A shows a circuitry for reducing the analog startup time in some embodiments.

Based on simulations, the periodicity of scanning interval 410 may allow for preamble detection without loss, while the periodicity of scanning interval 420 may allow for preamble detection in approximately 90% of cases.

Figure 5B:
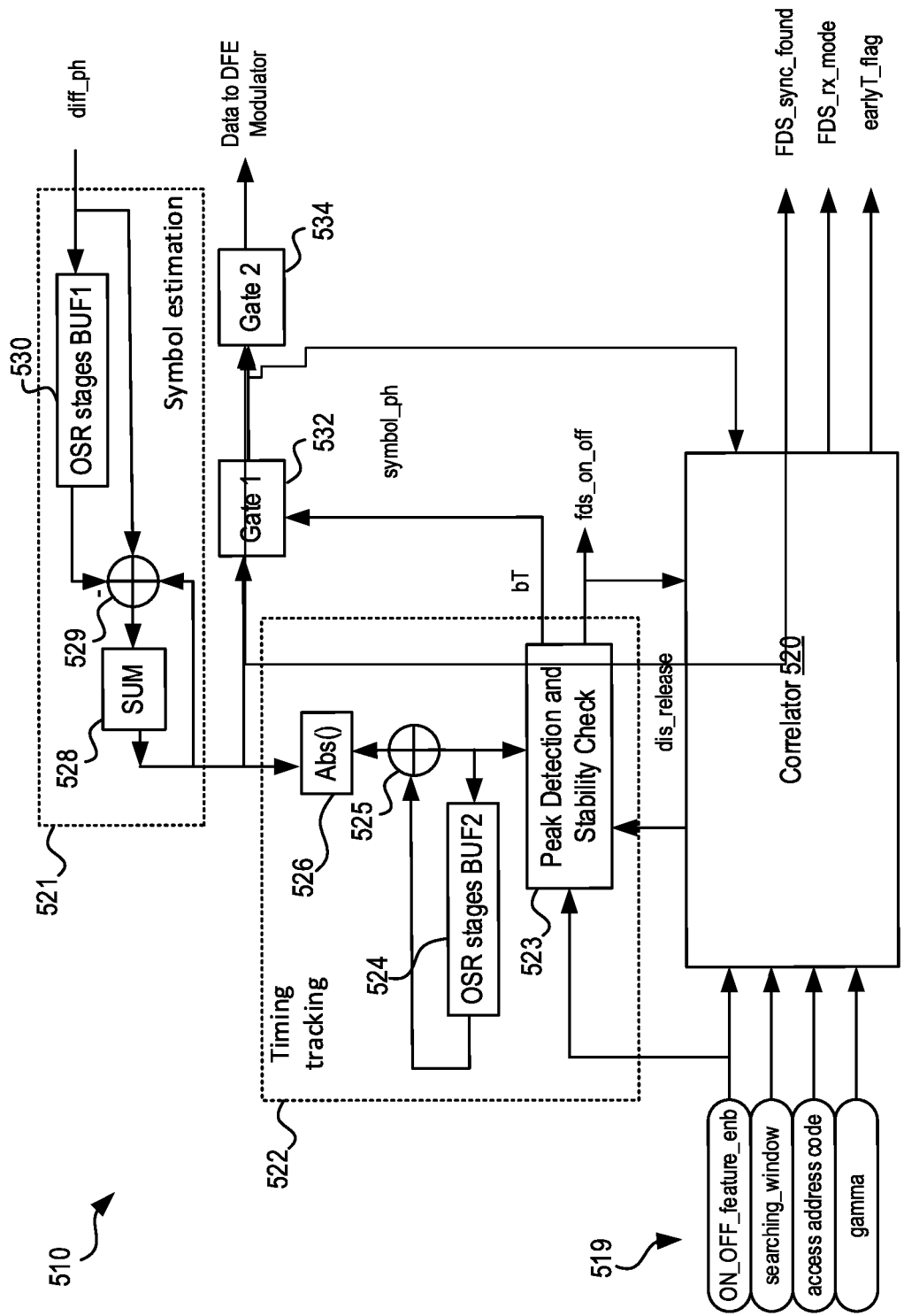
Figure 5C:
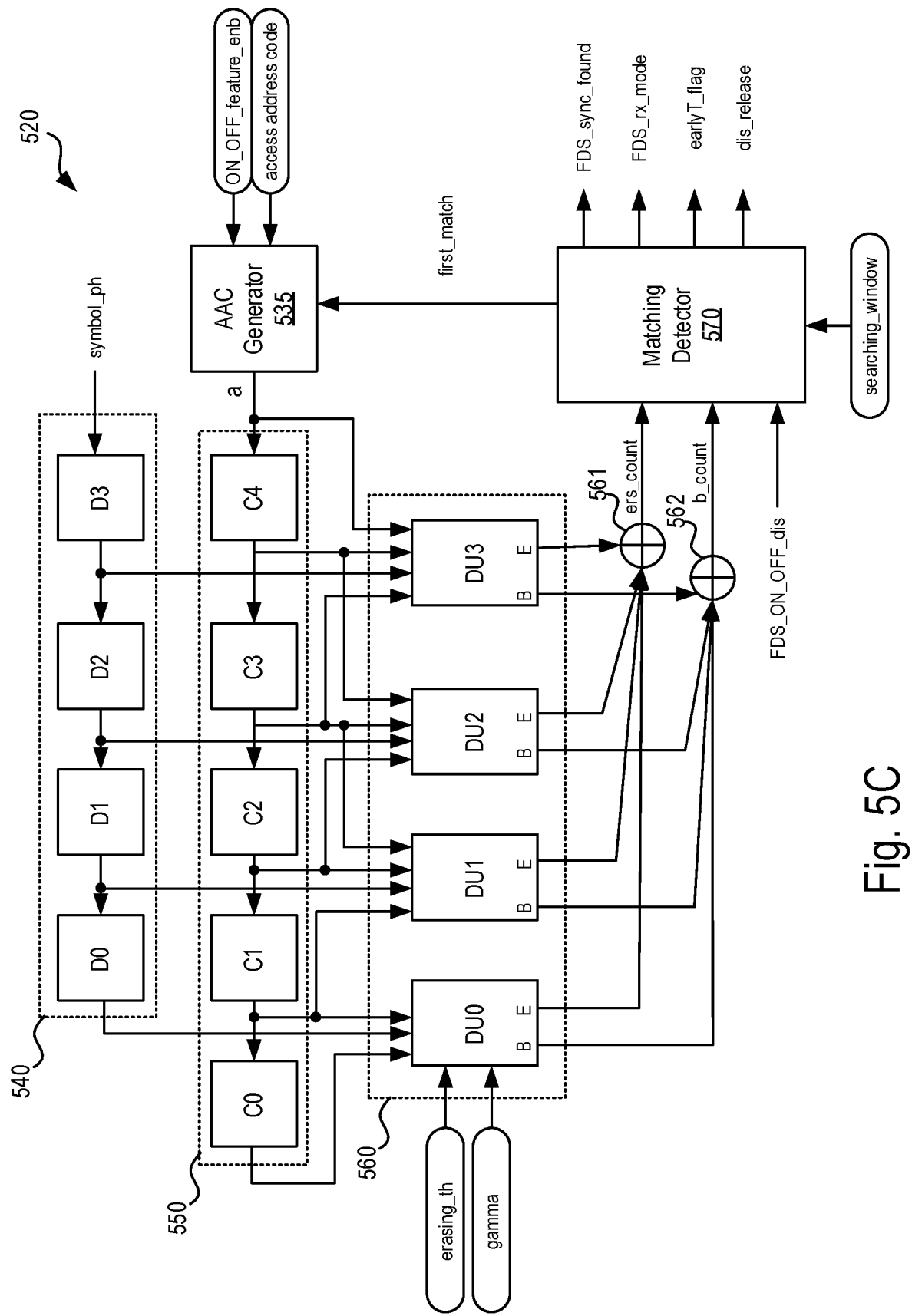
Figure 5D:
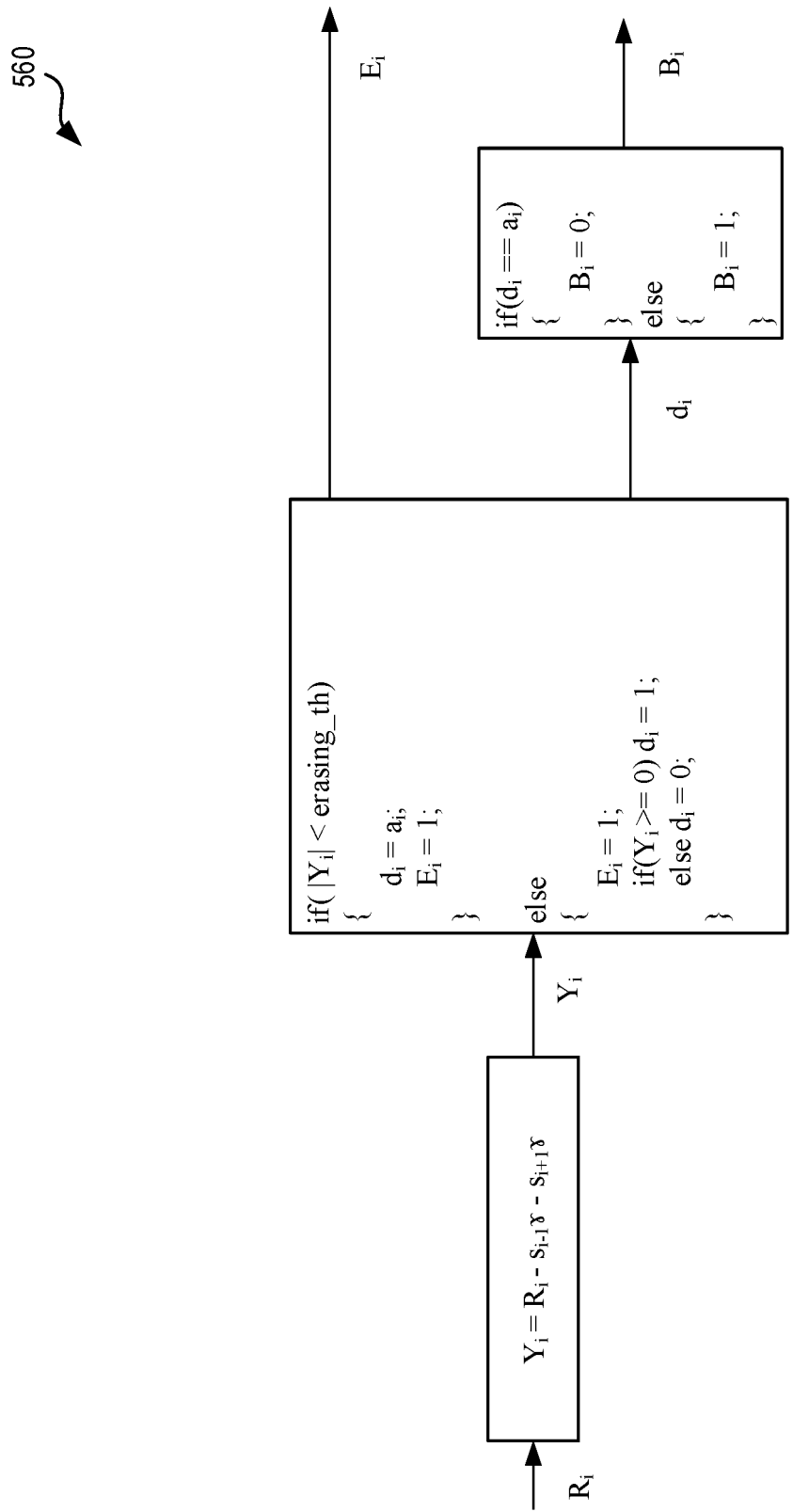

FIGS. 5A-5D are diagrams of an example system 500 for implementing a time-slotted scanning technique on a wireless receiver device according to some embodiments. In particular, FIG. 5A is a diagram of an overall architecture of the system 500, FIG. 5B is a diagram of example frequency-domain synchronizer (FDS) circuitry 510 for use in the system 500, FIG. 5C is a diagram of an example correlator 520 for use in the system 500, and FIG. 5D is a diagram of example logic implemented by decision units 560 of FIG. 5C according to some embodiments. One or more of the components of the example system 500 may be included in RF processing circuitry of a wireless device. For example, referring to FIG. 1, the example system 500 may be implemented in the Bluetooth circuitry 108. In some cases, at least some of the antennas 501, LNA 502, or both, may be implemented outside of the Bluetooth circuitry 108, as shown in FIG. 1.

Referring to FIG. 5A, the example system 500 includes antennas 501, low noise amplifier (LNA) 502, RF analog circuitry 503, digital front-end circuitry 504, on/off control circuitry 506, phase processing circuitry 508, FDS circuitry 510, mode selection circuitry 512, maximum likelihood sequence estimation (MLSE) demodulation circuitry 514, and decision feedback equalizer (DFE) demodulation circuitry 516. The system 500 may include additional or fewer components than those shown, in some embodiments. Although on/off circuitry 506 is shown in FIG. 5A as a distinct/dedicated component, it could, according to some embodiments, include circuitry in any processor within a system device, such as for example circuitry that is at least partially part of an application processor, such as processor 104 of FIG. 1.

The RF analog circuitry 503 may include circuitry for processing RF signals received by the antennas 501. For example, the receiver circuitry may include one or more of an amplifier (e.g., a low noise amplifier (LNA)), a filter, an automatic gain control (AGC) feedback loop, an RF peak detector, analog mixer, or another type of circuitry for analog processing of the RF signals. For example, the RF analog circuitry 503 may convert a received RF signal into IF band and translate it to a digital signal. The digital front-end circuitry 504 may include circuitry for digitally processing the signals received by the antennas 501 and processed by the RF analog circuitry 503. For example, the digital front-end circuitry 504 may handle a sampling rate change, carrier frequency offset removal, or out-of-band interference suppression. The digital front-end circuitry 504 may, in some cases, output in-phase and quadrature signals (I and Q signals). The digital front-end circuitry 504 may be implemented by a digital signal processing (DSP) apparatus in some instances. Together, the RF analog circuitry 503 and the digital front-end circuitry 504 may be referred to as receiver circuitry 505. In some cases, the system 500 may include an external low noise amplifier (eLNA) such as LNA 502. The eLNA may work in lieu of a LNA within the RF analog circuitry 503, or may work in conjunction with a LNA in the RF analog circuitry 503.

The on/off control circuitry 506 includes circuitry to switch the RF analog circuitry 503, digital front-end circuitry 504, or both (synchronously) between an on-mode and an off-mode according to a time-slotted scheme as described herein. For example, the on/off control circuitry 506 may duty cycle the RF analog circuitry 503 and the digital front-end circuitry 504 between on and off-modes (i.e., periods of time when the RF analog circuitry 503 is powered and not powered, respectively). The on/off control circuitry 506 may indicate the on- or off-mode to the circuitries 503, 504 via the ON_OFF_ctrl signal as shown in FIG. 5A. Most of the power savings in the time-slotted scheme may be achieved from not powering the RF analog circuitry 503 or the digital front-end circuitry 504 during the off-mode. In some embodiments, an external component to the system 500, e.g., an external low noise amplifier (eLNA) may be powered off during the off-mode as well. The switching between the on-mode and off-mode may be done according to a particular timing pattern, which may be dictated by the ON_period and OFF_period signals. In some cases, the ON_period and OFF_period signals may indicate static periods for the respective on- and off-modes in the time-slotted scheme. In other cases, the ON_period and OFF_period signals may be dynamically determined as described herein. In some cases, the on/off control circuitry 506 may also switch other components of the system 500, such as the LNA 502, between an on- and off-mode along with the receiver circuitry 505, as shown in FIG. 5A. In some cases, certain components of the receiver circuitry 505 may remain in an on-mode even while other components are being switched between on- and off-modes. For example, in certain embodiments, a phase locked loop (PLL) of the RF analog circuitry 503 may always remain in an on-mode since it may have a long settling time that may not be compatible with certain time-slotted switching techniques.

In some embodiments, the on/off control circuitry 506 may be enabled or turned on by an rx_on signal, which may be generated by firmware coupled to the system 500. The ON_OFF_ctrl signal may be propagated by the digital front-end circuitry 504 to the phase processing circuitry 508 as the prog_ON_OFF_ctrl signal, as shown, to switch the phase processing circuitry 508 between an on-mode and off-mode. Further, the phase processing circuitry 508 may propagate the on/off signal to the FDS 510 as the FDS_ON signal to switch the FDS between an on- and off-mode.

When in the on-mode, the RF analog circuitry 503 and digital front-end circuitry 504 may process signals received by the antennas 501, and may pass such signals to the phase processing circuitry 508 and FDS circuitry 510 for additional processing. The phase processing circuitry 508 may determine a phase of the signals output by the digital front-end circuitry 504 (e.g., I/Q signals) and a differential phase signal (diff_ph), which may be provided to the FDS circuitry 510 for synchronization. The FDS circuitry 510 may perform a correlation on the signals received by the antennas 501 to detect whether a pattern exists in the signals. For instance, the FDS circuitry 510 may determine whether the signals include at least a portion of a preamble or access address code (AAC) of a Bluetooth Low Energy (BLE) data packet, an access code or header data of a Bluetooth Basic Rate (BR) data packet, or a data packet of another type of wireless communication protocol (e.g., WiFi). If the FDS circuitry 510 detects such a pattern in the received signals, it may provide a signal (ON_OFF_Jeature_enb) to the on/off control circuitry 506 to cause the circuitry 506 to hold the RF analog circuitry 503 and the digital front-end circuitry 504 in the on-mode so that additional packet data may be received and processed by the system 500.

If the FDS circuitry 510 detects a pattern in the received signals, then it may output the FDS_ON_OFF_dis signal to the on/off control circuitry 506 so that the on/off control circuitry 506 may disable the time-slotted mode of operation and hold the receiver circuitry 505 in the on-mode. In addition, the FDS circuitry 510 may indicate as much to the mode selection circuitry 512 (via the FDS_sync_found and FDS_rx_mode signals), which may determine whether to operate in a time-domain or frequency-domain demodulation mode. In some cases, for example, the FDS circuitry 510 may detect a synchronization word of a data packet to align the demodulation circuitry on data payload reception. If the mode selection circuitry 512 determines to operate in a time-domain demodulation mode, it may provide the MLSE_ON signal to the MLSE demodulation circuitry 514 and the MLSE demodulation circuitry 514 may demodulate the output of the digital front-end circuitry 504 to provide a data output based on the demodulation. If the mode selection circuitry 512 determines to operate in a frequency-domain demodulation mode, then the mode selection circuitry 512 may provide the DFE_ON signal to the DFE demodulation circuitry 516 and the DFE demodulation circuitry 516 may demodulate the output of the FDS circuitry 510 and provide a data output based on the demodulation.

Referring to FIG. 5B, the example FDS circuitry 510 includes correlator circuitry 520, a symbol estimation block 521, and a timing tracking block 522. The symbol estimation block 521 receives the differential phase signal diff_ph from the phase processing circuitry 508 of the system 500 shown in FIG. 5A. The differential phase signal diff_ph is provided to an over sampling rate (OSR) stages BUF1 block 530, which may include an OSR stage flip-flop register type buffer, in some instances. The output of the OSR stages BUF1 block 530 is then provided to a subtracting input of an adder element 529. The output of the adder element 529 is provided to a SUM block 528, which may include a one stage flip-flop register buffer in some cases. The adder element 529 receives the output of the OSR stages BUF1 block 530, a copy of the differential phase signal diff_ph, and a feedback signal from the output of the SUM block 528. The adder element 529 adds the SUM output with the current differential phase input and subtracts the $(OSR+1)^{th}$ previous differential phase input, and the result is buffered into the SUM block 528. The SUM block 528 and adder element 529 accordingly work together as an accumulator, which operates according to the following equation:

$$SUM(n) = \sum_{k=0}^{OSR-1} \Delta\varphi(n-k) \quad n = 0, 1, 2 \ldots$$

where SUM(n) denotes the value stored in a buffer of the SUM block 528 at a time n; and $\Delta\varphi(n)$ is the differential phase input at a time n. Thus, the SUM block 528 may buffer the accumulation of OSR consecutive differential phase inputs, which is a kind of symbol data estimation for 2GFSK (binary Gaussian frequency-shift keying) modulation. The OSR consecutive SUM block 528 outputs will provide an OSR versions estimation of a received symbol with a different timing offset. The synchronization function of the FDS circuitry 510 may thus determine which timing offset is the optimum one.

The timing tracking block 522 includes an absolute value block 526 that operates to determine an absolute value of an input signal and provide it as an output. An adder element 525 receives the output of the absolute value block 526. An OSR stages BUF2 block 524, which may include a ORS stage flip-flop type buffer, receives its input from the adder element 525 and also provides its output to the adder element 525. In certain aspects, the OSR stages BUF2 block 524 may be cleared at a beginning of operation of the FDS circuitry 510. The OSR version estimations of a received symbol may be accumulated in the OSR stages BUF2 block 524 with the same timing-shifts version of a previously estimated symbol. Because only one version of symbol estimation is correct at a symbol boundary, a peak will show up with the accumulation processing. A peak detection and stability block 523 is connected to receive the output of the adder element 525 and may determine or check a peak position (which is output as a signal denoted as bT=best timing to gate element 532) of the accumulation for every OSR input.

A gate element 532 is connected to receive the output signal bT of the peak detection and stability block 523. The gate element 532 may turn on once, at the bT (best timing) point, for every OSR input. The output of the gate element 532 may therefore be at the symbol rate rather than at a higher over sampling rate. The best timing signal bT can be initialized to any value at the beginning of operation of the FDS circuitry 510. In some cases, the best timing signal bT may converge to an optimal value after the FDS circuitry 510 has operated for some duration of time. If the best timing signal bT does not converge to a value within a certain time period, it may be assumed that no desired 2GFSK signal is being received by the system 500.

The correlator circuitry 520 receives as its input a signal output by the gate element 532 that is at the symbol rate and not at a higher over sampling rate. The correlation window size may be independent of the over sampling rate OSR. The lower rate may provide potential hardware cost savings for the correlator circuitry 520 through the use of the lower cost components/circuits compared to circuitry that is required to operate at a higher sampling rate.

When the correlation value meets a certain threshold, the correlator circuitry 520 may provide the fds_sync_found signal to the gate element 534 as an indication that the synchronization has been found. In some cases, the fds_sync_found signal may indicate that a pattern has been detected in the received signals, and that the gate element 534 can be turned on. The output of the gate element 534 can be directly fed into the input of the DFE demodulation circuitry 516 of the system 500 shown in FIG. 5A.

Referring to FIG. 5C, the correlator circuitry 520 is implemented as a 4-symbols based correlator design. In the example shown, the correlator circuitry 520 may test for multiple packet timing hypotheses when the receiver device wakes up to scan. This is different from a conventional scanning receiver that is constantly in an on-mode and therefore would have received the preamble and can correlate from the start of the AAC. During an on-mode of the time-slotted scheme, the correlator circuitry 520 may be capable of recognizing that a valid signal (e.g., a valid BLE advertising packet, BR inquiry or paging packet, or the like) is being received at the RF analog circuitry 503 through detection of a recognized bit pattern in the signals (e.g., the preamble and/or the AAC of a BLE packet), but may also be able to terminate operation when the correlator 520 is not able to match any version of the time-shifted bit-patterns of the received signals with a preamble and/or access address periods to achieve further power savings. If a bit pattern is recognized by the correlator 520 in the preamble and AAC period of a BLE packet, for example, the correlator 520 may continue operating until the end of the AAC period and may proceed to process (e.g., demodulate) the payload and CRC portions of the packet as they are received.

In the example shown in FIG. 5C, the received signal is divided into multiple segments with four symbols in every segment. Four registers 540 (D0 through D3) are provided to buffer the output from the gate element 532, shown as symbol_ph in FIG. 5C. Five registers 550 (C0 through C4) are provided to buffer data provided by AAC generator 535. Four decision units 560 (DU0 through DU3) are provided for matching detection. As described further below, each decision unit 560 has an "E" output and an "B" output. The "B" output indicates whether the received data matches the corresponding AAC bit; the "E" output shows whether the received bit has been erased. The B outputs are connected to an adder element 562 to provide a b_count signal to matching detector 570, and the E outputs of the decision units 560 are provided to an adder element 561 to provide an ers_count signal to the matching detector 570. The matching detector 570 may then send a matching flag signal (first_match) to the AAC generator 535 and may output a sync found signal (FDS_sync_found) and a demodulation mode signal (FDS_rx_mode) when a pattern is detected.

If the ON_OFF_Jeature_enb signal is low, the AAC generator 535 may provide 4-bits output at a time. The output of the AAC generator 535 may be based on a reference address access code input to the AAC generator 535, as shown. After the first 4-bits are matched, the next 4-bits of an AAC may be provided, and so on. Once the first 4 symbols matching is found, first_match goes to high and the AAC generator 535 will then push out 4 AAC bits for every 4 bits received as data inputs until all AAC bits are finished. The number of AAC generator bits may be predetermined in some cases.

To detect a match, the matching detector 570 checks the signal b_count (error count on data decision), and when the first zero is identified (e.g., found the first 4 symbols matched), the first_match signal will go to high. The fds_sync_found will be generated as long as a match is identified through the end of AAC period of the received data packet. When fds_sync_found has been found, fds_rx_mode may be generated based on the sum of ers_count (which is the count of erasing events happened on the AAC matching). After fds_on_off_dis is received (that is, timing is locked), if the erasing rate is high for certain time period, it means timing is wrong locked on the noise, dis_release should be generated to release fds_on_off_dis, then system will go back to the time-slotted mode wherein the RF analog circuitry 503 is switched between the on- and off-mode. If a correlation match can't be found for a certain period of time after timing is locked and erasing rate is not high, it may indicate a BLE signal is being received and the AAC might already be missed. In this case, an early termination flag (earlyT_flag) may be generated, and the system 500 may initiate the time-slotted mode of operation. The earlyT_flag may be provided, in some cases, to firmware coupled to the system 500.

In some cases, a dynamically determined on/off cycling timing pattern may be used. For example, the peak detection and stability check circuitry 523 of FIG. 5B (which measures wideband RSSI) may be compared with the output of a signal bandwidth filter in order to detect the presence/level of proximate out-of-signal-band interference. If interference is detected, a longer "ON" period may be used in the next upcoming time-slotted scanning period. Extending the scan window of the time-slotted scheme dynamically as a function of collocated (e.g. in-device 2.4 GHz radio transmissions) and proximate (e.g. nearby WiFi networks) interference may improve packet detection time statistics. Because 2.4 GHz interference is bursty (e.g. WiFi packets are typically short in duration, due to the high modulation rates), even though the preamble/AAC portions of a BLE packet may be affected, the payload portion may not be affected. So, it is of interest to improve time-slotted scanning synchronization performance in the presence of interference. Analogously, the SNR (signal-to-noise ratio) of the received signal, measured during the first few microseconds of when the slotted "ON" period starts may also be used as an indicator to dynamically increase the "ON" scan duration window if the signal level is low. By basing the time-slotted scan timing based on these metrics, the probabilities of missed detections and false alarms may be lowered. In BLE receivers, these probabilities may also be further lowered by discarding any recognized BR packet data.

Referring to FIG. 5D, logic for implementing each of the decision units 560 is shown. Assuming the on and off time are each 10 μs, and assuming we need 8 symbols to lock on the timing detection, then a bad detection situation may be: during the first on time only 7 preambles are caught, then off period comes due to timing not locked. The off time will drop 10 symbols, so the next on time AAC will be received from $9^{th}$ symbol to $19^{th}$ symbol. Therefore, the ambiguity on AAC position for the first time searching is from 1 to 19. Thus, for the correlator design, we define the decision unit first. Let 32-bits AAC be expressed as $(a_0, a_1, \ldots, a_{31})$, $a_i \in \{0, 1\}$, $i=0, 1, \ldots, 31$; and the corresponding mapped sequence $(s_0, s_1, \ldots, s_{31})$, where $$s_i = \begin{cases} +1 & \text{if } a_i = 1 \\ -1 & \text{if } a_i = 0 \end{cases} \quad i = 0, 1, \ldots, 31$$

In the example decision unit 560, $R_i$ denotes the received data in the correlation window buffer, as indicated by the searching_buffer signal. The logic $Y_i = R_i - s_{i-1}\gamma - s_{i+1}\gamma$ performs the ISI (inter symbol interference) cancellation, where i is the ISI factor introduced by GFSK modulation, $s_{i-1}$ and $s_{i=1}$ are the previous and the post symbol of $s_i$. Because $s_{i-1}$ and $-s_{i+1}$ are either +1 or −1, no multiplication operation is needed for ISI cancellation. For 2GFSK modulation with modulation index h, the idea phase span of a received symbol should be ±hπ. The key point of the proposed algorithm is the selection of soft threshold erasing_th which is smaller than hπ. When $|Y_i|$<erasing_th happens, we assume the received data $d_i$ is $a_i$; otherwise, the value of $d_i$ is based on the conventional decision rule.

Figure 6B:
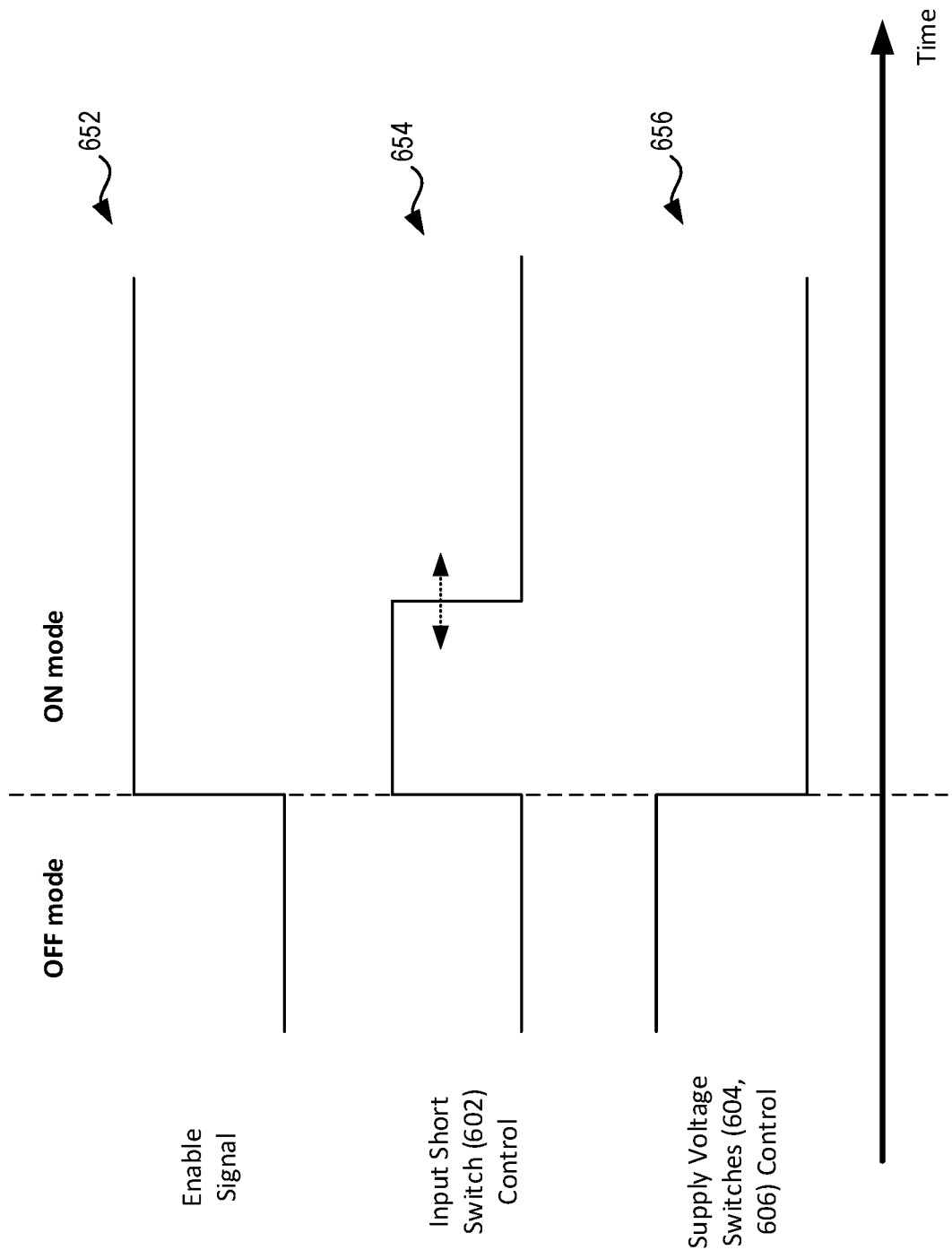

FIGS. 6A-6B are diagrams of an example scheme for reducing analog filter settling times in a wireless receiver device implementing a time-slotted scanning technique according to some embodiments. In particular, FIG. 6A illustrates an analog filter circuit 600 for implementing the scheme, and FIG. 6B is a diagram of example signals 652, 654, 656 used in implementing the scheme for reducing settling times in the filter circuit 600. In some cases, the example circuit 600 can be implemented in RF processing circuitry of a wireless receiver device (e.g., in the Bluetooth circuitry 108 of the device 102 of FIG. 1) to speed up the settling time of analog circuitry of the RF processing circuitry caused by the on/off cycling described above, such that only approximately 1 μs (e.g., 1-2 bits) are lost due to these transient effects. The analog filter circuit settling times may, in some cases, set a lower bound on how short the duration of the on-mode can be in a time-slotted scheme as described herein.

Analog settling time may typically be limited as fundamental property of the filter transfer function, H(s), with lower filter low pass cutoff frequencies leading to slower transient settling times. This presents a bottleneck to realize a fast start-up time for systems with low frequency cut-offs such as intermediate-frequency (IF) filter circuits. To avoid this problem, techniques shown in FIGS. 6A-6B may be used. These techniques may apply to filter structures that includes a combination of active elements, such as an operational amplifier (OpAmp) or trans-conductance cell and passive elements (e.g., capacitors and resistors), as shown in the circuit 600 of FIG. 6A.

In the example shown, the switches 604, 606 may first be activated, when the RF processing circuitry is in an off-mode of a time-slotted scanning technique, such that the capacitors in the circuit 600 are pre-charged to the state value. In the example shown, the filter input and outputs are shorted to the supply voltage when the switches 604, 606 are activated, which has the additional benefit of providing voltage to the active circuitry 608 such that it is strongly on when the enable signal 652 of FIG. 6B is asserted (when the RF processing circuitry is switched into the on-mode) to the active circuitry 608, expediting overall startup time.

As shown in FIG. 6B, when the RF processing circuitry is switched into the on-mode, the enable signal 652 is asserted, the switches 604, 606 are de-activated by signal 656, and the input to the circuit 600 may be shorted by activating switch 602 by signal 654 during a short duration of time to prevent settling caused by a received input signal. The duration of time for the pulse signal 654 may be programmable, as shown in FIG. 6B. Together, this avoids the problem of slow settling because no net charging occurs in the energy storage elements (e.g., the capacitors of the filter circuit 600) and the startup time is independent of the filter bandwidth. Additionally, the active circuitry 608 includes a the OpAmp 610 and a startup circuit 612 coupled to the OpAmp 610. The startup circuit 612 may aid in starting up the filter circuit 600. These techniques, or a combination thereof, may be independent of the order of the filter circuit 600 and can therefore be used with any filter order, such as with cascaded filter stages (which may be implemented similar to the filter circuit 600) coupled to the output of the circuit 600.

Figure 7:
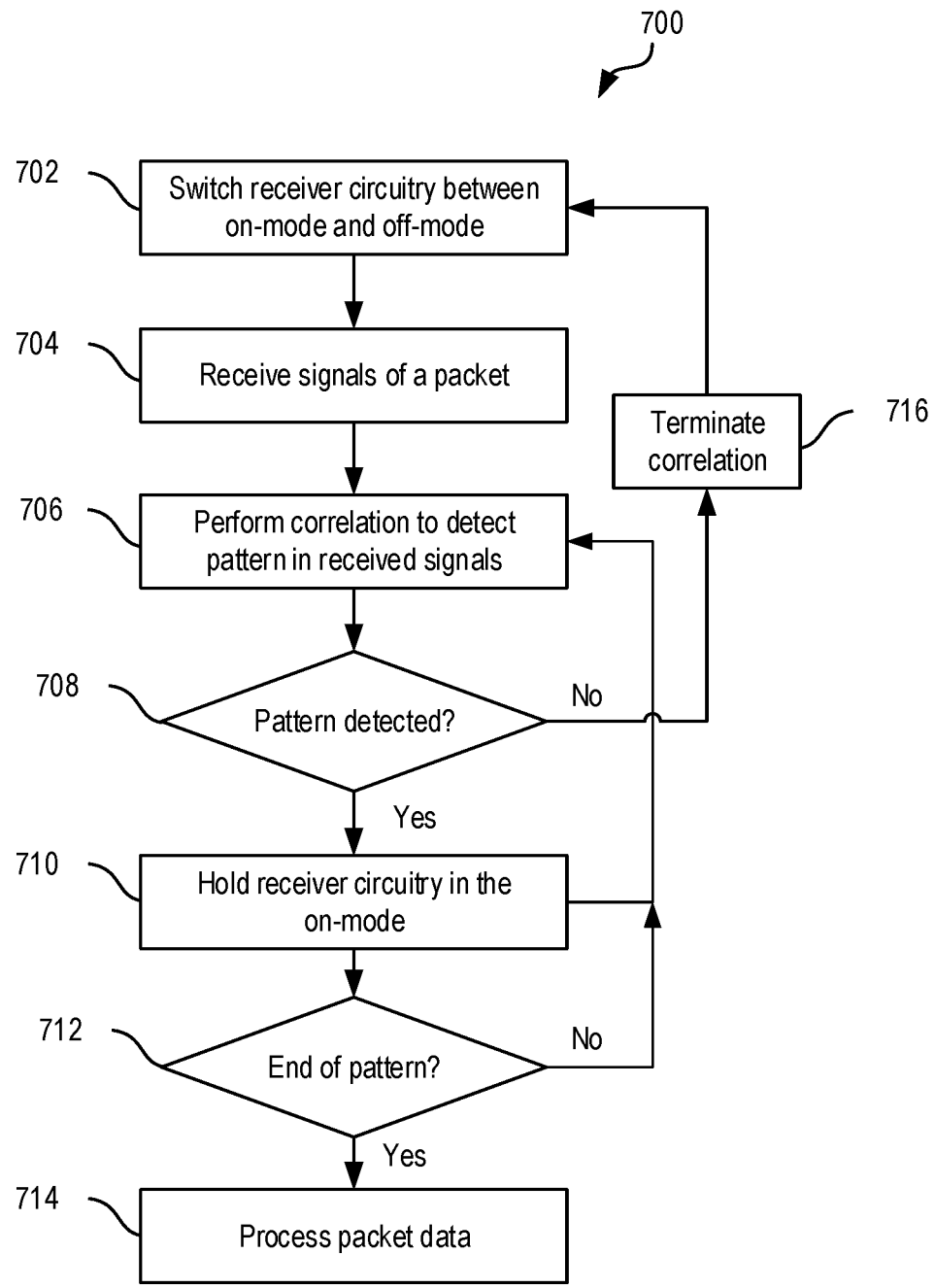
FIG. 7 is a flow diagram showing an example process for implementing a time-slotted scanning technique on a wireless receiver device according to some embodiments.

FIG. 7 is a flow diagram showing an example process 700 for implementing a time-slotted scanning technique on a wireless receiver device according to some embodiments. Operations in the example process 700 may be performed by circuitry of a wireless communication device (e.g., by the Bluetooth circuitry 108, the WLAN circuitry 110, or both, in the example shown in FIG. 1) in some instances. The example process 700 may include additional or different operations, and the operations may be performed in the order shown or in another order. In some cases, one or more of the operations shown in FIG. 7 are implemented as processes that include multiple operations, sub-processes, or other types of routines. In some cases, operations can be combined, performed in another order, performed in parallel, iterated, or otherwise repeated or performed another manner.

At 702, receiver circuitry is switched between an on-mode and an off-mode in a time-slotted mode of operation. The receiver circuitry switched between the on- and off-mode may include RF analog circuitry (e.g., the RF analog circuitry 503 of FIG. 5A), digital front-end circuitry (e.g., the digital front-end circuitry 504 of FIG. 5A), other types of circuitry (e.g., the phase processing circuitry 508 or FDS 510 of FIG. 5A) in a processing circuitry chip (e.g., the Bluetooth circuitry 108 of FIG. 1), or a combination thereof. In some cases, the receiver circuitry is switched between the on-mode and the off-mode in a static timing pattern. In other cases, the receiver circuitry is switched between the on-mode and the off-mode in a dynamically determined timing pattern based on at least one of a detection of wireless interference or a determined signal-to-noise ratio (SNR). In some cases, at 702, components external to the receiver circuitry (e.g., external low noise amplifiers (eLNAs)), or other circuitry within the receiver device may be switched between an on-mode and an off-mode along with the receiver circuitry.

At 704, signals of a packet are received. The signals may include portions of a data packet formatted according to a wireless communication protocol, such as a Bluetooth protocol. For example, the signals may include at least one of preamble data and access address data of a Bluetooth Low Energy (BLE) advertising packet. As another example, the signal may include at least one of at least one of access code data and packet header data of a Bluetooth Basic Rate (BR) packet (e.g., a paging or inquiry packet).

At 706, a correlation is performed to detect whether a pattern exists in the received signals. The correlation may include testing multiple packet timing hypotheses. In some cases, the correlation may determine whether a pattern that corresponds to a preamble and/or address access code (AAC) of a BLE packet exists in the signals. This may include generating at least a portion (e.g., a certain number of bits) of an AAC and comparing the generated AAC portion to the signals of the packet received at 702. In some cases, the correlation may determine whether a pattern that corresponds to the access code or packet header of a BR packet exists in the signals.

If a pattern is detected at 708, then the receiver circuitry is held in the on-mode at 710. During this time, additional signals are received and are correlated to ensure that the pattern continues to be detected. The correlation may continue until the end of the pattern period (e.g., the AAC period for a BLE packet) is detected at 712, and may thereafter process the packet data at 714. In some cases, this may include demodulating the payload data of the packet. In some cases, this may include demodulating a CRC portion of the packet and verifying the packet payload data based on the CRC. For example, a CRC value may be calculated based on the payload data of the packet and may be compared with the packet CRC value to detect an error in the packet data.

If, at some point during the correlation (e.g., immediately or at some point after the receiver circuitry is held in the on-mode), no pattern is detected at 708, then the correlation is terminated at 716 and the receiver is placed back into the time-slotted mode of operation at 702 whereby the receiver circuitry is switched between the on-mode and the off-mode.

Functions, operations, components and/or features described herein with reference to one or more embodiments, may be combined with, or may be utilized in combination with, one or more other functions, operations, components and/or features described herein with reference to one or more other embodiments, or vice versa.

Examples

The following examples pertain to further embodiments. It will be understood that certain examples listed below may be combined with other examples, or certain aspects of other examples.

Example 1 includes an apparatus of a wireless communication device, the apparatus comprising: control circuitry to cause receiver circuitry of the wireless communication device to switch between an on-mode and an off-mode;

synchronizing circuitry to: perform a correlation on signals of a packet received by the receiver circuitry when in the on-mode to detect a pattern in the received signals; and cause the control circuitry to hold the receiver circuitry in the on-mode based on detection of the pattern in the received signals; and demodulation circuitry to process additional signals of the packet received by the receiver circuitry when held in the on-mode.

Example 2 includes the subject matter of Example 1, and optionally, wherein the control circuitry is further to turn off a low noise amplifier (LNA) of the wireless communication device when the receiver circuitry is in an off-mode. The LNA may be internal or external to the receiver circuitry.

Example 3 includes the subject matter of Example 1, and optionally, wherein the synchronizing circuitry is to perform the correlation by testing multiple packet timing hypotheses.

Example 4 includes the subject matter of Example 1, and optionally, wherein the synchronizing circuitry comprises a 4-symbol-based correlator circuit to perform the correlation.

Example 5 includes the subject matter of Example 1, and optionally, wherein the synchronizing circuitry is further to terminate the correlation based on detection of no recognized bit pattern in the received signals.

Example 6 includes the subject matter of Example 1, and optionally, wherein the synchronizing circuitry is to perform the correlation to detect at least one of preamble data and access address data of a Bluetooth Low Energy (BLE) advertising packet.

Example 7 includes the subject matter of Example 1, and optionally, wherein the synchronizing circuitry is to perform the correlation to detect at least one of at least one of access code data and packet header data of a Bluetooth Basic Rate (BR) packet.

Example 8 includes the subject matter of Example 1, and optionally, wherein the control circuitry is to cause the receiver circuitry to switch between the on-mode and the off-mode in a static timing pattern.

Example 9 includes the subject matter of Example 1, and optionally, wherein the control circuitry is to cause the receiver circuitry to switch between the on-mode and the off-mode in a dynamically determined timing pattern based on at least one of a detection of wireless interference or a determined signal-to-noise ratio (SNR).

Example 10 includes the subject matter of Example 1, and optionally, wherein: the receiver circuitry comprises an analog filter circuit comprising input terminals and one or more circuit elements; and the control circuitry is further to: connect the circuit elements of the analog filter circuit to a supply voltage when the receiver circuitry is in the off-mode; and short input terminals of the analog filter circuit for a duration of time upon switching the receiver circuitry to the on-mode.

Example 11 includes the subject matter of Example 1, and optionally, wherein the synchronizing circuitry is further to: generate at least a portion an access address code; and compare the generated access address code portion to the signals of the packet received by the receiver circuitry.

Example 12 includes the subject matter of Example 1, and optionally, wherein the receiver circuitry comprises RF analog circuitry and digital front-end circuitry, and the control circuitry is to synchronously switch the RF analog circuitry and the digital front-end circuitry between an on-mode and an off-mode.

Example 13 includes the subject matter of Example 1, and optionally, further comprising error detection circuitry to: detect an error in the additional signals of the packet; and discard the packet based on detection of the error in the additional signals.

Example 14 includes the subject matter of Example 13, and optionally, wherein the error detection circuitry is to detect an error in the additional signals of the packet by: computing a cyclical redundancy check (CRC) value based on the additional signals of the packet; and comparing the computed CRC value with a CRC value in the additional signals of the packet to detect an error.

Example 15 includes a method for time-slotted wireless device operation, comprising: switching receiver circuitry of a wireless communication device between an on-mode and an off-mode; performing a correlation on signals of a packet received by the receiver circuitry when in the on-mode to detect a pattern in the received signals; holding the receiver circuitry in the on-mode based on detection of the pattern in the received signals; and processing additional signals of the packet received by the receiver circuitry when held in the on-mode.

Example 16 includes the subject matter of Example 15, and optionally, further comprising turning off a low noise amplifier (LNA) of the wireless communication device when the receiver circuitry is in an off-mode. The LNA may be internal or external to the receiver circuitry.

Example 17 includes the subject matter of Example 15, and optionally, wherein performing the correlation comprises testing multiple packet timing hypotheses.

Example 18 includes the subject matter of Example 15, and optionally, further comprising terminating the correlation based on detection of no recognized bit pattern in the received signals.

Example 19 includes the subject matter of Example 15, and optionally, wherein the signals of the packet include at least one of preamble data and access address data of a Bluetooth Low Energy (BLE) advertising packet.

Example 20 includes the subject matter of Example 15, and optionally, wherein the signals of the packet include at least one of at least one of access code data and packet header data of a Bluetooth Basic Rate (BR) packet.

Example 21 includes the subject matter of Example 15, and optionally, wherein the receiver circuitry is switched between the on-mode and the off-mode in a static timing pattern.

Example 22 includes the subject matter of Example 15, and optionally, wherein the receiver circuitry is switched between the on-mode and the off-mode in a dynamically determined timing pattern based on at least one of a detection of wireless interference or a determined signal-to-noise ratio (SNR).

Example 23 includes the subject matter of Example 15, and optionally, further comprising: connecting the circuit elements of the analog filter circuit in the receiver circuitry to a supply voltage when the receiver circuitry is in the off-mode; and shorting input terminals of the analog filter circuit for a duration of time upon switching the receiver circuitry to the on-mode.

Example 24 includes the subject matter of Example 15, and optionally, further comprising: generating at least a portion an access address code; and comparing the generated access address code portion to the signals of the packet received by the receiver circuitry.

Example 25 includes the subject matter of Example 15, and optionally, wherein switching the receiver circuitry comprises synchronously switching RF analog circuitry and digital front-end circuitry between an on-mode and an off-mode.

Example 26 includes the subject matter of Example 15, and optionally, further comprising: detecting an error in the additional signals of the packet; and discarding the packet data based on detection of the error in the additional signals.

Example 27 includes the subject matter of Example 26, and optionally, wherein detecting an error in the additional signals of the packet comprises: computing a cyclical redundancy check (CRC) value based on the additional signals of the packet; and comparing the computed CRC value with a CRC value in the additional signals of the packet to detect an error.

Example 28 includes a non-transitory computer-readable medium comprising instructions that are, when executed by processing circuitry, to: switch receiver circuitry of a wireless communication device between an on-mode and an off-mode; perform a correlation on signals of a packet received by the receiver circuitry when in the on-mode to detect a pattern in the received signals; hold the receiver circuitry in the on-mode based on detection of the pattern in the received signals; and process additional signals of the packet received by the receiver circuitry when held in the on-mode.

Example 29 includes the subject matter of Example 28, and optionally, wherein the instructions are further to turn off a low noise amplifier (LNA) of the wireless communication device when the receiver circuitry is in an off-mode. The LNA may be internal or external to the receiver circuitry.

Example 30 includes the subject matter of Example 28, and optionally, wherein the instructions are further to perform the correlation comprises testing multiple packet timing hypotheses.

Example 31 includes the subject matter of Example 28, and optionally, wherein the instructions are further to terminate the correlation based on detection of no recognized bit pattern in the received signals.

Example 32 includes the subject matter of Example 28, and optionally, wherein the instructions are further to detect at least one of preamble data and access address data of a Bluetooth Low Energy (BLE) advertising packet.

Example 33 includes the subject matter of Example 28, and optionally, wherein the instructions are further to detect at least one of at least one of access code data and packet header data of a Bluetooth Basic Rate (BR) packet.

Example 34 includes the subject matter of Example 28, and optionally, wherein the instructions are further to switch the receiver circuitry between the on-mode and the off-mode in a static timing pattern.

Example 35 includes the subject matter of Example 28, and optionally, wherein the instructions are further to switch the receiver circuitry between the on-mode and the off-mode in a dynamically determined timing pattern based on at least one of a detection of wireless interference or a determined signal-to-noise ratio (SNR).

Example 36 includes the subject matter of Example 28, and optionally, wherein the instructions are further to: connect the circuit elements of the analog filter circuit in the receiver circuitry to a supply voltage when the receiver circuitry is in the off-mode; and short input terminals of the analog filter circuit for a duration of time upon switching the receiver circuitry to the on-mode.

Example 37 includes the subject matter of Example 28, and optionally, wherein the instructions are further to synchronously switch RF analog circuitry and digital front-end circuitry between an on-mode and an off-mode.

Example 38 includes the subject matter of Example 28, and optionally, wherein the instructions are further to: generate at least a portion an access address code; and compare the generated access address code portion to the signals of the packet received by the receiver circuitry.

Example 39 includes the subject matter of Example 28, and optionally, wherein the instructions are further to: detect an error in the additional signals of the packet; discard the packet based on detection of the error in the additional signals.

Example 40 includes the subject matter of Example 39, and optionally, wherein detecting an error in the additional signals of the packet comprises: computing a cyclical redundancy check (CRC) value based on the additional signals of the packet; and comparing the computed CRC value with a CRC value in the additional signals of the packet to detect an error.

Example 41 includes a system, comprising: receiver circuitry; means for switching the receiver circuitry between an on-mode and an off-mode; means for performing a correlation on signals of a packet received by the receiver circuitry when in the on-mode to detect a pattern in the received signals; means for causing the receiver circuitry to remain in the on-mode based on detection of the pattern in the received signals; and means for processing additional signals of the packet received by the receiver circuitry when the receiver circuitry is caused to remain in the on-mode based on detection of the pattern.

Example 42 includes the subject matter of Example 41, and optionally, comprising means for turning off a low noise amplifier (LNA) of the wireless communication device when the receiver circuitry is in an off-mode. The LNA may be internal or external to the receiver circuitry.

Example 43 includes the subject matter of Example 41, and optionally, comprising means for performing the correlation by testing multiple packet timing hypotheses.

Example 44 includes the subject matter of Example 41, and optionally, comprising means for terminating the correlation based on detection of no recognized bit pattern in the received signals.

Example 45 includes the subject matter of Example 41, and optionally, comprising means for detecting at least one of preamble data and access address data of a Bluetooth Low Energy (BLE) advertising packet.

Example 46 includes the subject matter of Example 41, and optionally, comprising means for detecting at least one of at least one of access code data and packet header data of a Bluetooth Basic Rate (BR) packet.

Example 47 includes the subject matter of Example 41, and optionally, comprising means for causing the receiver circuitry to switch between the on-mode and the off-mode in a static timing pattern.

Example 48 includes the subject matter of Example 41, and optionally, comprising means for causing the receiver circuitry to switch between the on-mode and the off-mode in a dynamically determined timing pattern based on at least one of a detection of wireless interference or a determined signal-to-noise ratio (SNR).

Example 49 includes the subject matter of Example 41, and optionally, comprising means for: connecting the circuit elements of the analog filter circuit in the receiver circuitry to a supply voltage when the receiver circuitry is in the off-mode; and shorting input terminals of the analog filter circuit for a duration of time upon switching the receiver circuitry to the on-mode.

Example 50 includes the subject matter of Example 41, and optionally, comprising means for synchronously switching RF analog circuitry and digital front-end circuitry between an on-mode and an off-mode.

Example 51 includes the subject matter of Example 41, and optionally, comprising means for: generating at least a portion of an access address code; and comparing the generated access address code portion to the signals of the packet received by the receiver circuitry.

Example 52 includes the subject matter of Example 41, and optionally, comprising means for: detecting an error in the additional signals of the packet; discarding the packet data based on detection of the error in the additional signals.

Example 53 includes the subject matter of Example 52, and optionally, comprising means for: computing a cyclical redundancy check (CRC) value based on the additional signals of the packet; and comparing the computed CRC value with a CRC value in the additional signals of the packet to detect an error.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of a wireless communication device, the apparatus comprising:
    control circuitry to cause receiver circuitry of the wireless communication device to switch between an on-mode and an off-mode;
    synchronizing circuitry to:
        perform a correlation on signals of a packet received by the receiver circuitry when in the on-mode to detect a bit pattern in the received signals, wherein the correlation is based on testing multiple packet timing hypotheses; and
        cause the control circuitry to hold the receiver circuitry in the on-mode based on detection of the bit pattern in the received signals; and
    demodulation circuitry to process additional signals of the packet received by the receiver circuitry when held in the on-mode.

2. The apparatus of claim 1, wherein the control circuitry is further to turn off a low noise amplifier (LNA) of the wireless communication device when the receiver circuitry is in an off-mode.

3. The apparatus of claim 1, wherein the synchronizing circuitry comprises a 4-symbol-based correlator circuit to perform the correlation.

4. The apparatus of claim 1, wherein the synchronizing circuitry is further to terminate the correlation based on detection of no recognized bit pattern in the received signals.

5. The apparatus of claim 1, wherein the control circuitry is to cause the receiver circuitry to switch between the on-mode and the off-mode in a static timing pattern.

6. The apparatus of claim 1, wherein the control circuitry is to cause the receiver circuitry to switch between the on-mode and the off-mode in a dynamically determined timing pattern based on at least one of a detection of wireless interference or a determined signal-to-noise ratio (SNR).

7. The apparatus of claim 1, wherein the synchronizing circuitry is to perform the correlation to detect at least one of preamble data and access address data of a Bluetooth Low Energy (BLE) advertising packet.

8. The apparatus of claim 1, wherein the synchronizing circuitry is to perform the correlation to detect at least one of at least one of access code data and packet header data of a Bluetooth Basic Rate (BR) packet.

9. The apparatus of claim 1, wherein:
    the receiver circuitry comprises an analog filter circuit comprising input terminals and one or more circuit elements; and
    the control circuitry is further to:
        connect the circuit elements of the analog filter circuit to a supply voltage when the receiver circuitry is in the off-mode; and
        short input terminals of the analog filter circuit for a duration of time upon switching the receiver circuitry to the on-mode.

10. The apparatus of claim 1, wherein the synchronizing circuitry is further to:
    generate at least a portion of an access address code; and
    compare the generated access address code portion to the signals of the packet received by the receiver circuitry.

11. The apparatus of claim 1, wherein the receiver circuitry comprises RF analog circuitry and digital front-end circuitry, and the control circuitry is to synchronously switch the RF analog circuitry and the digital front-end circuitry between an on-mode and an off-mode.

12. The apparatus of claim 1, further comprising error detection circuitry to:
    detect an error in the additional signals of the packet; and
    discard the packet based on detection of the error in the additional signals.

13. The apparatus of claim 12, wherein the error detection circuitry is to detect an error in the additional signals of the packet by:
    computing a cyclical redundancy check (CRC) value based on the additional signals of the packet; and
    comparing the computed CRC value with a CRC value in the additional signals of the packet to detect an error.

14. A method for time-slotted wireless device operation, comprising:
    switching receiver circuitry of a wireless communication device between an on-mode and an off-mode;
    performing a correlation on signals of a packet received by the receiver circuitry when in the on-mode to detect a bit pattern in the received signals, wherein performing the correlation comprises testing multiple packet timing hypotheses;
    holding the receiver circuitry in the on-mode based on detection of the bit pattern in the received signals; and
    processing additional signals of the packet received by the receiver circuitry when held in the on-mode.

15. The method of claim 14, further comprising turning off a low noise amplifier (LNA) of the wireless communication device when the receiver circuitry is in an off-mode.

16. The method of claim 14, further comprising:
    connecting circuit elements of an analog filter circuit in the receiver circuitry to a supply voltage when the receiver circuitry is in the off-mode; and
    shorting input terminals of the analog filter circuit for a duration of time upon switching the receiver circuitry to the on-mode.

17. A non-transitory computer-readable medium comprising instructions that are, when executed by processing circuitry, to:
    switch receiver circuitry of a wireless communication device between an on-mode and an off-mode;
    perform a correlation on signals of a packet received by the receiver circuitry when in the on-mode to detect a bit pattern in the received signals, wherein the correlation is based on testing multiple packet timing hypotheses;

hold the receiver circuitry in the on-mode based on detection of the bit pattern in the received signals; and process additional signals of the packet received by the receiver circuitry when held in the on-mode.

18. The non-transitory computer-readable medium of claim 17, wherein the instructions are further to turn off a low noise amplifier (LNA) of the wireless communication device when the receiver circuitry is in an off-mode.

19. The non-transitory computer-readable medium of claim 17, wherein the instructions are further to terminate the correlation based on detection of no recognized bit pattern in the received signals.

20. The non-transitory computer-readable medium of claim 17, wherein the instructions are to switch the receiver circuitry between the on-mode and the off-mode in a static timing pattern.

21. The non-transitory computer-readable medium of claim 17, wherein the instructions are to switch the receiver circuitry between the on-mode and the off-mode in a dynamically determined timing pattern based on at least one of a detection of wireless interference or a determined signal-to-noise ratio (SNR).

22. The non-transitory computer-readable medium of claim 17, wherein the instructions are further to:

generate at least a portion an access address code; and compare the generated access address code portion to the signals of the packet received by the receiver circuitry.

23. The non-transitory computer-readable medium of claim 17, wherein the packet is one of a Bluetooth Low Energy (BLE) advertising packet and a Bluetooth Basic Rate (BR) packet.

* * * * *